United States Patent [19]
Sorgen, III

[11] Patent Number: 6,045,258

[45] Date of Patent: *Apr. 4, 2000

[54] TEMPERATURE-MEASURING ASSEMBLY

[76] Inventor: Carl H. Sorgen, III, 2156 E. State Rd., Port Clinton, Ohio 43452

[*] Notice: This patent issued on a continued prosecution application filed under 37 CFR 1.53(d), and is subject to the twenty year patent term provisions of 35 U.S.C. 154(a)(2).

[21] Appl. No.: 08/786,405

[22] Filed: Jan. 21, 1997

[51] Int. Cl.⁷ .............................. G01K 1/08; G01K 13/00; G01K 1/14

[52] U.S. Cl. ............................................. 374/150; 374/141

[58] Field of Search ..................................... 374/150, 208, 374/146, 207, 141

[56] References Cited

U.S. PATENT DOCUMENTS

| | | | |
|---|---|---|---|
| 1,330,457 | 2/1920 | Wicke | 374/146 |
| 1,493,938 | 5/1924 | Machesky et al. | 374/146 |
| 1,529,176 | 3/1925 | Florman | 374/146 |
| 1,713,107 | 5/1929 | Veitch | 374/146 |

*Primary Examiner*—Diego Gutierrez
*Assistant Examiner*—Maria Fernandez
*Attorney, Agent, or Firm*—Allen D. Gutchess, Jr.

[57] ABSTRACT

A temperature-measuring assembly indicates temperatures in a cold space subject to relatively rapid changes in air temperature from time-to-time. The assembly includes an elongate, tubular container having an open end. A cap with an opening therein is located on the open end of the container. A thermometer with a temperature-sensing stem extends through the opening and through a substantial distance of the container. The thermometer has a temperature indicator on the stem outside the container. An antifreeze liquid substantially fills the container, surrounding the stem. The temperature of this liquid is sensed by the stem and indicated on the temperature indicator outside the container. The liquid changes temperature much more slowly than changes in the air temperature in the cold space.

9 Claims, 2 Drawing Sheets

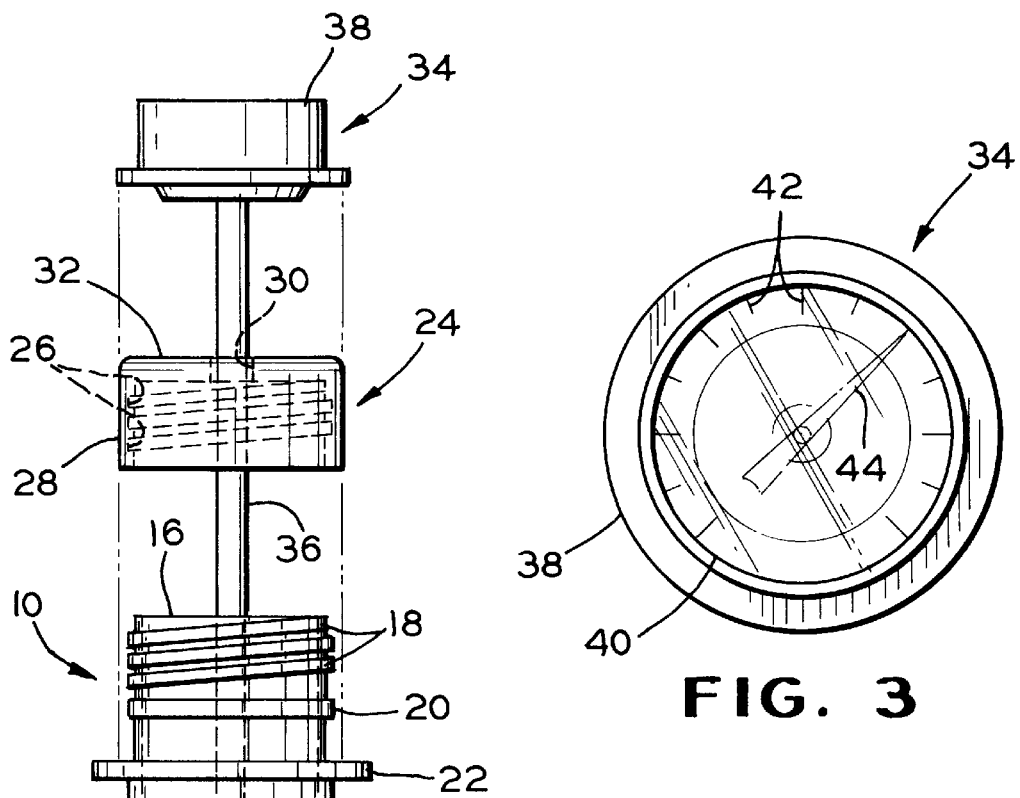
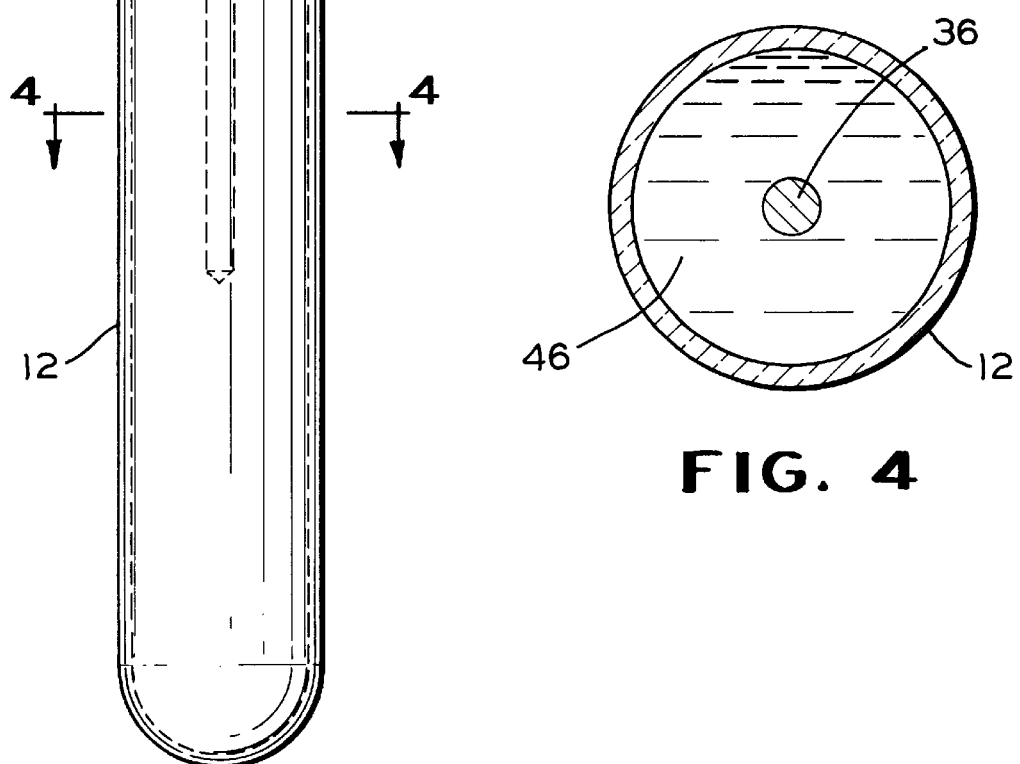
FIG. 2
FIG. 3
FIG. 4

ND, 258

TEMPERATURE-MEASURING ASSEMBLY

SUMMARY OF THE INVENTION

A temperature-measuring assembly is provided for indicating temperatures in cold spaces which are subject to relatively rapid changes in temperature from time-to-time.

The temperature-measuring assembly according to the invention is designed particularly for use in refrigerators. In refrigerators, including freezers, the temperature rises quickly when the door is opened, giving an inaccurate reading to the thermometer often used therein. The temperature-measuring assembly can also be used in large, walk-in coolers and freezers. In such freezers, which have a defrost cycle, again an inaccurate reading can be made when the freezer is going through a defrost cycle. This reading has resulted, in some instances, in a call to a repairman or a health department citation even though the unit is operating normally. These false readings occur because the thermometers employed in the cold spaces are in direct contact with the air therein and the temperature sensed changes rapidly with rapid changes in air temperature.

A temperature-measuring assembly in accordance with the invention includes an elongate, tubular container having an open end, a cap for closing off the open end, and means for holding the cap on the container. The cap has a central opening therein and a thermometer having a temperature-sensing stem extends through the opening and a substantial distance through the container toward a closed end thereof. The thermometer also has temperature-indicating means connected to the stem outside the container. This can be in the form of a dial with a pointer or can be a digital type of indicator.

In accordance with the invention, an antifreeze liquid is added to the container, substantially filling the container around the stem. The temperature-indicating means senses and indicates the temperature of the antifreeze liquid in the container, rather than sensing the temperature of the air in the cold space. This substantially eliminates false readings caused by sudden, temporary changes in air temperatures because the antifreeze liquid changes temperature slowly compared to the changes in air temperature.

It is, therefore, a principal object of the invention to provide a temperature-measuring assembly which includes a container having a liquid therein which changes temperature much more slowly than changes in the air temperature in a cold space.

BRIEF DESCRIPTION OF THE DRAWINGS

Other objects and advantages of the invention will be apparent from the following detailed description of a preferred embodiment thereof, reference being made to the accompanying drawings, in which:

FIG. 2 is an exploded view in elevation of the assembly components of FIG. 1;

FIG. 3 is a top view of a temperature-sensing indicator embodied in a thermometer constituting part of the assembly; and FIG. 4 is a view in transverse cross section taken along the line 4—4 of FIG. 2.

DESCRIPTION OF THE PREFERRED EMBODIMENT

Figure 1:
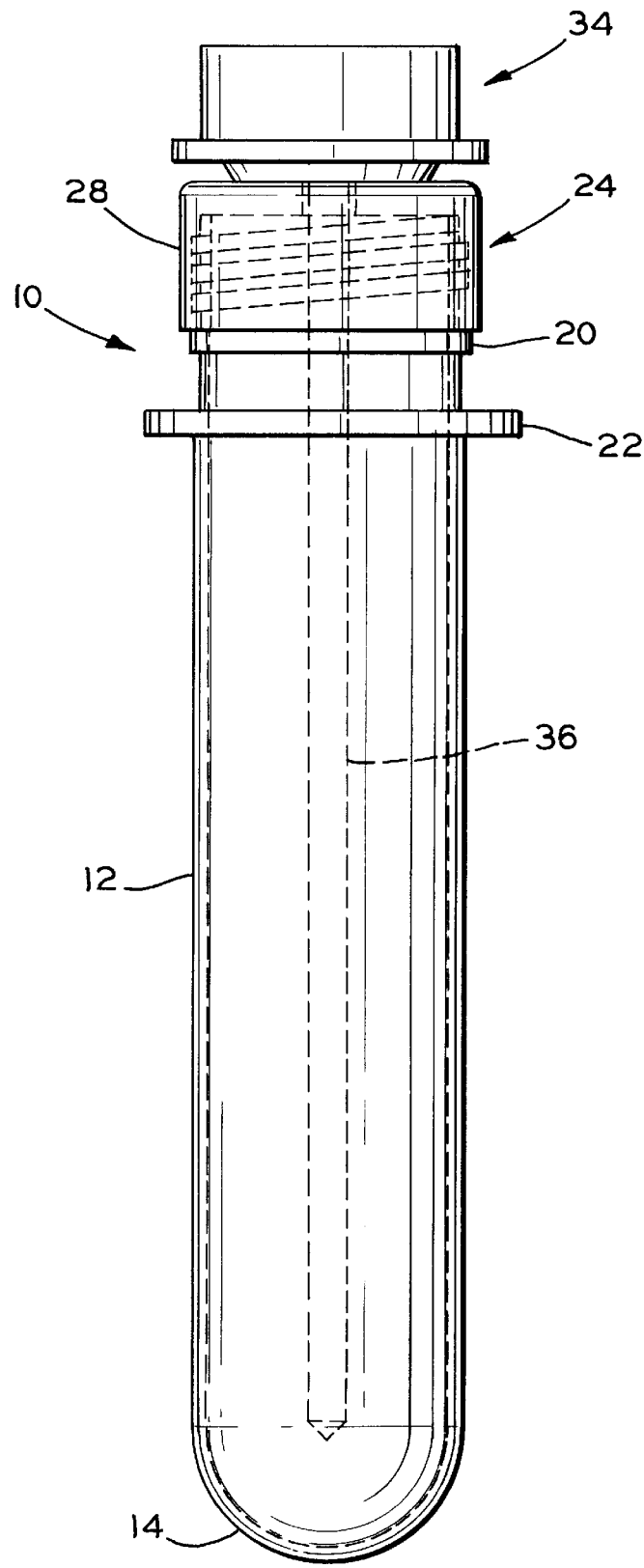
FIG. 1 is a view in elevation of a temperature-measuring assembly according to the invention, in an assembled condition.

A temperature-measuring assembly 10 according to the invention includes an elongate, plastic container 12. The container 12 has a closed end 14 and an open end 16 with threads 18. The threads have a thicker band 20 at the lower end thereof and a flange 22 below the band 20. The container 12 preferably is a soft drink bottle blank which is used to make a two-liter soft drink bottle. These are inexpensive and are usually readily available. Many of these blanks have the flange 22 thereon but they do not have any particular purpose for the temperature-measuring assembly 10.

A threaded cap 24 is preferably of plastic. It has internal threads 26 in a side wall 28 and a central hole or opening 30 in a top 32.

A thermometer 34 is commercially-available and includes a temperature-sensing stem 36 extending through the opening 30. The thermometer 34 also has temperature-indicating means 38 located at an outer end of the stem 36, outside the container 12. The temperature-indicating means can be in the form of a dial 40 (FIG. 3) having indicia 42 on the face thereof and a pointer 44. A digital-type indicator can also be used.

When the components are assembled, the stem 36, which can be bimetallic, extends through the opening 30 and a substantial distance toward the closed end 14 of the container 12 (FIG. 1). Before assembly, caulk or other suitable sealant is applied around threads 18 to help seal off the container and make it difficult for one to easily open it. The caulk or sealant is also located around the stem 36 at the opening 30 for sealing purposes.

Prior to assembly, antifreeze liquid 46 (FIG. 4) is added to the container 12 to substantially fill it. This liquid then surrounds the stem 36 after assembly. The antifreeze liquid can be propylene glycol which is a food-grade antifreeze. A solution of approximately sixty-five percent propylene glycol and thirty-five percent water is preferably used which will not freeze until the temperature drops to about minus eighty degrees Fahrenheit (−80° F.). The temperature-indicating dial preferably has a range from minus forty degrees Fahrenheit (−40° F.) to plus one hundred eighty degrees Fahrenheit (+180° F.).

The thermometer 34 is approved by the National Sanitation Foundation. The thermometer 34 senses the temperature of the antifreeze 46 rather than sensing the temperature of the air of the freezer, cooler, or other cold space in which it is used. The temperature of the antifreeze liquid 46 fluctuates more slowly than the air so that rapid, false readings are not obtained. Thus, inaccurate readings will not be made when the freezer or cooler is going through a defrost cycle. This has resulted, in some instances, in a call to a repairman even though the unit is operating normally. It is also possible for the health department to issue a citation if an inaccurate, high reading is obtained in a cooler during the defrost cycle.

The temperature-measuring assembly 10 is shown substantially in full-size in FIG. 1. As such, it is readily portable to be moved to different locations, particularly when carried by a refrigeration repairman.

A safety seal can be employed on the lower edge of the cap 24 and extends below the band 20. This seal is broken if the cap 24 is removed, to indicate tampering.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A temperature-measuring assembly for indicating temperatures in cold spaces subject to relatively rapid changes in temperature, said assembly comprising an elongate, tubular container having an open end and a closed end, a cap, means on said open end and on said cap for holding said cap on said container for closing off said open end, said cap having a central opening therein, a thermometer having a temperature-sensing stem extending through said opening in sealing relationship and a substantial distance toward the closed end of said container, said thermometer having temperature-indicating means connected to said stem outside said container for indicating temperature, and an anti-freeze liquid substantially filling said container around said stem, said temperature-indicating means indicating the temperature of said antifreeze liquid in said container sensed by said temperature-sensing stem; said container, said cap, and said stem completely isolating said antifreeze liquid from the cold spaces.

2. A temperature-measuring assembly according to claim 1 wherein said means on said open end and on said cap for holding the cap on said container comprises external threads on an outer surface of said container adjacent said open end and internal threads in said cap threaded with said container threads.

3. A temperature-measuring assembly according to claim 1 wherein said anti-freeze liquid comprises propylene glycol.

4. A temperature-measuring assembly according to claim 3 wherein said propylene glycol is in a solution comprising approximately sixty-five percent propylene glycol and thirty-five percent water.

5. A temperature-measuring assembly according to claim 1 wherein said temperature-indicating means comprises a dial having indicia thereon and a pointer.

6. In combination, means forming a cold space containing air subject to relatively rapid changes in temperature from time-to-time and a temperature-measuring assembly in the cold space, said assembly comprising an elongate, hollow container having an open end and a closed end, a cap for said container, means for holding said cap on said container for closing off the open end, said cap having a central opening therein, a thermometer having a temperature-sensing stem extending in sealing relationship through said opening and toward the closed end of said container, said thermometer having temperature-indicating means located outside said container for indicating the temperature measured by said stem, and an antifreeze liquid substantially filling said container around said stem; said container, said cap, and said stem completely isolating said antifreeze liquid from the air in the cold space, said temperature-sensing means sensing the temperature of said antifreeze liquid in said container rather than the temperature of the air in the cold space around the assembly.

7. The combination according to claim 6 wherein said means on said open end and on said cap for holding the cap on said container comprises external threads on an outer surface of said container adjacent said open end and internal threads in said cap threaded with said container threads.

8. The combination according to claim 6 wherein said antifreeze liquid comprises propylene glycol.

9. The combination according to claim 8 wherein said propylene glycol is in a solution comprising approximately sixty-five percent propylene glycol and thirty-five percent water.

* * * * *